No. 870,415. PATENTED NOV. 5, 1907.
H. D. CHANCE.
APPARATUS FOR CANNING AND WASHING.
APPLICATION FILED DEC. 26, 1906.
2 SHEETS—SHEET 1.
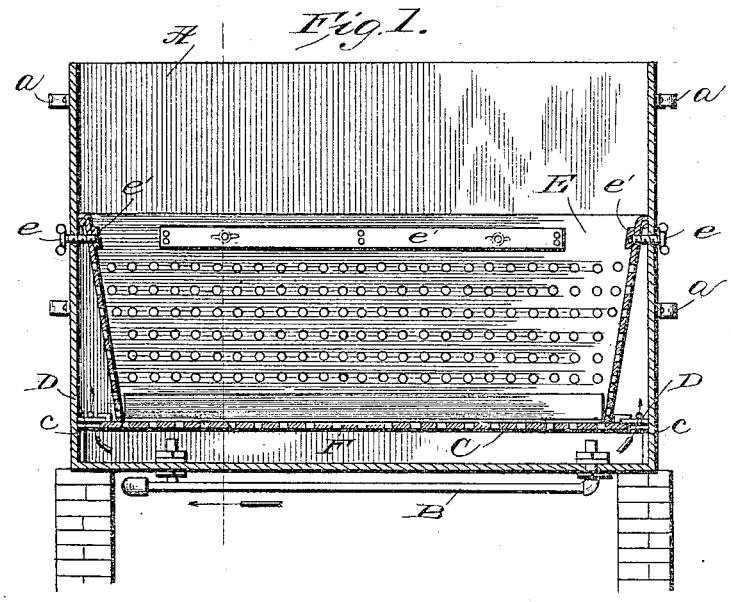
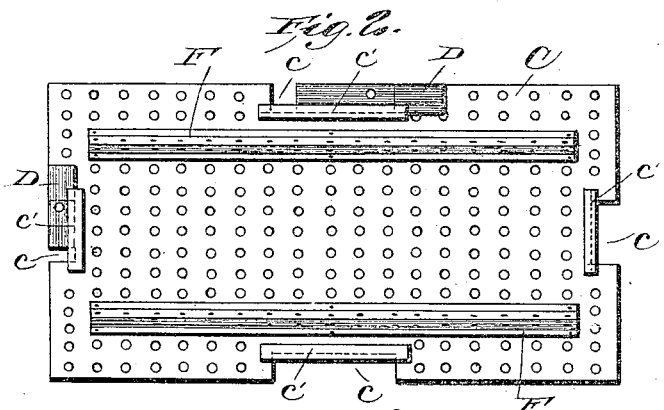
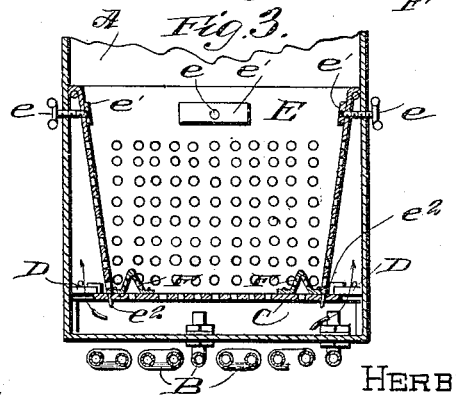
WITNESSES
INVENTOR
HERBERT D. CHANCE
BY
ATTORNEYS No. 870,415. PATENTED NOV. 5, 1907.
H. D. CHANCE.
APPARATUS FOR CANNING AND WASHING.
APPLICATION FILED DEC. 26, 1906.
2 SHEETS—SHEET 2.
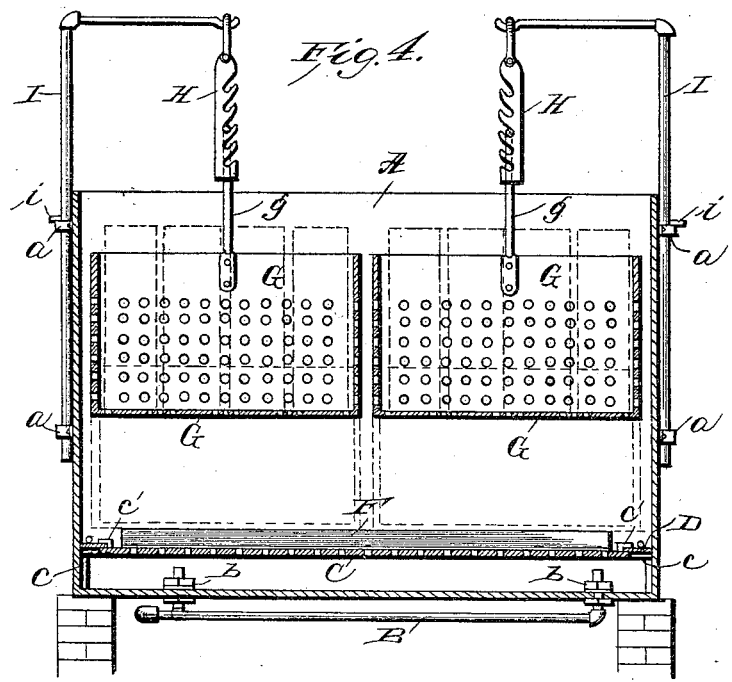
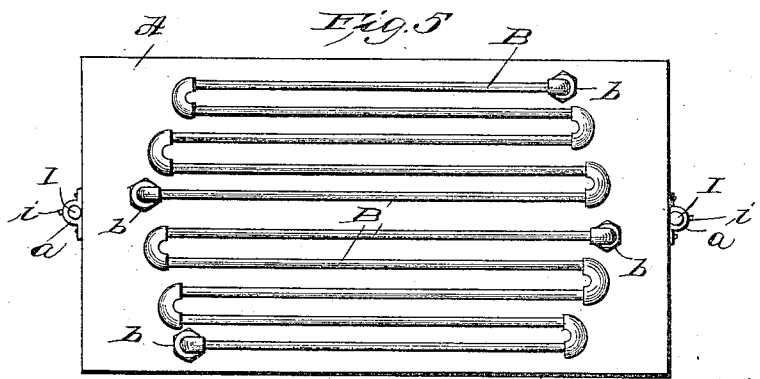
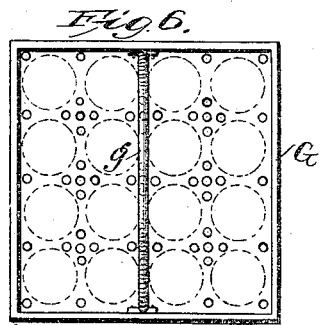
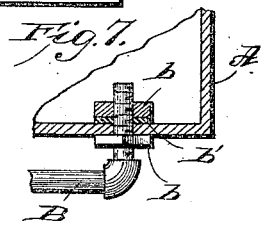
WITNESSES
E. M. Callaghan
Amos W. Hart
INVENTOR
HERBERT D. CHANCE
BY Munn & Co.
ATTORNEYS

UNITED STATES PATENT OFFICE.

HERBERT DON CHANCE, OF LOVELAND, COLORADO.

APPARATUS FOR CANNING AND WASHING.

No. 870,415.  Specification of Letters Patent.  Patented Nov. 5, 1907.

Application filed December 26, 1906. Serial No. 349,516.

*To all whom it may concern:*

Be it known that I, HERBERT D. CHANCE, a citizen of the United States, and a resident of Loveland, in the county of Larimer and State of Colorado, have invented an Improved Apparatus for Canning and Washing, of which the following is a specification.

My invention is an improved apparatus for heating water for use in cooking canned goods, or in cleansing clothes.

The details of construction, arrangement, and combination of parts are as hereinafter described and illustrated in the accompanying drawings, in which Figure 1 is a vertical section of the apparatus arranged for heating water for cleansing clothes. Fig. 2 is a plan view of the false-bottom of the water-heater or tank. Fig. 3 is a central vertical cross-section. Fig. 4 is a longitudinal vertical section of the apparatus arranged as a water-heater for cooking canned goods. Fig. 5 is a bottom plan view of the apparatus. Fig. 6 is a top plan view of one of the can holders. Fig. 7 is a detail section showing the manner of attaching the heating coil to the bottom of the water tank, or holder.

In the several figures, A indicates the water tank or holder which is constructed of stout sheet metal and has preferably an oblong rectangular form. In Figs. 1 and 4 this tank is shown supported upon arches or brick piers over a combustion chamber. The bottom of the tank is provided with two water-heating coils B; see Fig. 5. The convolutions of each coil are parallel to each other and to the bottom of the tank and are separated from the latter by a narrow space. The ends of the coils project upward through the bottom of the tank, as shown in Fig. 7, and are screw-threaded to adapt them for attachment of nuts $b$, each of which is provided with a washer $b'$. The tank A is filled with water to the required height, and the coils being exposed to the action of the flame and heated gases of combustion, and being thereby quickly heated, a circulation of water results, the same flowing in at one end of the coils and out at the other into the body of the tank. The latter is provided with a false-bottom C which consists of a stout metal plate having numerous perforations, as shown in Figs. 1 and 2. It is also provided with notches $c$ at the middle of the sides and ends, and sliding covers D are provided and made of such size that they may be adjusted to entirely or partly cover the openings. They are held in place by flanges $c'$, as shown in Fig. 2.

Within the tank A may be arranged a bottomless clothes-receptacle E, as shown in Figs. 1 and 3. The same is formed of stout sheet metal, the sides being inclined inward from the top downward and both sides and ends being provided with numerous perforations. It will be observed, however, that the perforations do not extend to the top of the receptacle. It is secured in position by means of screws $e$ which pass through the sides of the tank and also through plates $e'$ arranged on the inner side of the receptacle E. The bottom of the receptacle E rests upon the false bottom C of sheet metal; ribs F, formed of strips which have the form of an inverted V in cross section extend lengthwise of the false-bottom C parallel to the sides thereof and are separated from each other, as indicated in Fig. 2. The sides of these ribs F are perforated and they support clothes off portions of the false bottom so that water may circulate more freely through the clothes than would be otherwise practicable. The bottom and edge of the receptacle E are provided with a number of pendent pins $e^2$ that project down into openings in the false bottom C and aid in holding the receptacle in place.

Soiled clothes being placed in the receptacle E and heat being applied, circulation of water takes place in the coils B and up through the perforations in the false-bottom C and freely through the openings or notches $c$ the slides D being opened. It will be seen that the currents rising through the openings $c$ enter the spaces between the sides and ends of the receptacle E and the adjacent walls of the tank A, and pass through the numerous openings provided in the receptacle E, and thus through the clothes therein. The cleansing of the clothes therefore depends upon this free circulation of heated water, and it is not as a rule necessary that they should be lifted or adjusted in different positions. In other words the circulation of hot water will effect ordinary cleansing.

In Fig. 4, in place of the clothes-receptacle before described, I show receptacles G which are rectangular and formed of sheet metal and have perforated bottom and sides, and these may receive clothes as in the former case, or cans containing fruits, meats, vegetables, or other alimental substances requiring to be cooked, or, what is technically known as, "processed". In case the tank is used for cleansing clothes one kind of clothes may be placed in one of the receptacles, and another kind in another and these two kinds may be separately treated and cleansed, and one kind may be removed before the other is thoroughly cleansed. The ribs F serve to support receptacles G when lowered thereon as shown by dotted lines, Fig. 4; or when holding cans the receptacles G may be suspended by a bail $g$ from hangers H having a series of hooks which permit the receptacles G to be held at different heights in the tank and therefore submerged in the water contained in the tank. The hanger is supported upon a crane I which is journaled in keepers $a$ secured to the ends of the tank. A pin $i$ is inserted in the vertical member of the crane and rests upon the upper keeper $a$. This permits the crane to be readily detached when it is required to utilize the tank A for reception of the clothes-receptacle E, or the crane may be drawn to one side to permit the convenient removal of the can receptacles In Fig. 4, cans are indicated by dotted lines in position in the receptacles G. In Fig. 6 the arrangement of the cans is further illustrated, and also the arrangement of the holes in the bottom of the receptacles G, the same being made at points between those where the cans are located.

I claim—

1. The improved apparatus for the purpose specified, comprising a water holder or tank, a false perforated bottom having on its upper side a series of ribs, and a receptacle for articles to be subjected to the action of hot water, the same being formed of perforated sheet metal and arranged in said tank and supported on the said ribs, as described.

2. The improved apparatus for the purpose specified, comprising a water holder or tank, and a false-bottom arranged parallel to the true bottom of the tank but spaced therefrom and consisting of a perforated plate having on its upper side a series of ribs for supporting a receptacle for articles to be subjected to the action of hot water, and provided on its sides with openings for free circulation of water, and devices adapted for closing such openings, substantially as described.

HERBERT DON CHANCE.

Witnesses:
GEORGE ROOD,
MARCELLUS ROOD.